US010140715B2

(12) United States Patent
Jerebko (10) Patent No.: US 10,140,715 B2
(45) Date of Patent: Nov. 27, 2018

(54) METHOD AND SYSTEM FOR COMPUTING DIGITAL TOMOSYNTHESIS IMAGES

(71) Applicant: SIEMENS AKTIENGESELLSCHAFT, Munich (DE)

(72) Inventor: Anna Jerebko, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 1096 days.

(21) Appl. No.: 14/448,089

(22) Filed: Jul. 31, 2014

(65) Prior Publication Data

US 2016/0035102 A1 Feb. 4, 2016

(51) Int. Cl.
*G06K 9/00* (2006.01)
*G06T 7/00* (2017.01)
*G06T 11/00* (2006.01)
*G06T 7/13* (2017.01)
*G06T 7/155* (2017.01)

(52) U.S. Cl.
CPC ............. *G06T 7/0085* (2013.01); *G06T 7/13* (2017.01); *G06T 7/155* (2017.01); *G06T 11/008* (2013.01); *G06T 2207/10081* (2013.01); *G06T 2207/30068* (2013.01); *G06T 2211/436* (2013.01)

(58) Field of Classification Search
None
See application file for complete search history.

(56) References Cited

U.S. PATENT DOCUMENTS

| | | | | |
|---|---|---|---|---|
| 6,083,162 A | * | 7/2000 | Vining | G06T 7/0012 128/920 |
| 7,760,924 B2 | * | 7/2010 | Ruth | G06T 11/006 382/128 |
| 7,782,464 B2 | * | 8/2010 | Mujat | A61B 3/102 356/479 |
| 7,925,065 B2 | | 4/2011 | Valadez et al. | |
| 2010/0124359 A1 | * | 5/2010 | Vaidya | G06K 9/00771 382/103 |
| 2013/0229621 A1 | * | 9/2013 | Stetson | A61B 3/102 351/206 |
| 2016/0140749 A1 | * | 5/2016 | Erhard | G06T 15/205 345/424 |

FOREIGN PATENT DOCUMENTS

WO 2008024353 A2 2/2008

* cited by examiner

*Primary Examiner* — Weiwei Yang
(74) *Attorney, Agent, or Firm* — Laurence Greenberg; Werner Stemer; Ralph Locher (57) ABSTRACT

A method of performing digital tomosynthesis includes the steps of obtaining an initial volume (I) formed with a plurality of slices (100); performing edge detection in a slice (100); processing the detected edges ($11_E$) to obtain a weighting volume ($W_{xyz}$); and generating a composite slab ($S_{comp}$, $S_{meta}$) on the basis of the weighting volume ($W_{xyz}$).

17 Claims, 6 Drawing Sheets

METHOD AND SYSTEM FOR COMPUTING DIGITAL TOMOSYNTHESIS IMAGES

The invention describes a method of and system for computing digital tomosynthesis images.

Computed tomography (CT), usually X-ray computed tomography, is a widely-used medical diagnostic tool, which allows the generation of tomographic images or slices of an area of interest in a patient. Radiologists often prefer using thick slab or thick-slice volume for diagnostic and screening reading. For example, 5.0 mm slabs are often used for clinical reading and data storage in thoracic CT, although thin, high-resolution 0.5 mm slabs are available and used for computer applications such as 3D volume rendering and computer-aided diagnosis algorithms. It is relatively easy to compute 3.0-5.0 mm slabs in thoracic CT images without losing diagnostically relevant information, for example by applying methods such as Average Intensity Projection (AIP) or Maximum Intensity Projection (MIP). The slab thickness is related to the combined thickness of the original slices in the volume. Generally, a slab is rendered as a 2D image, so that the image can be printed or viewed on a computer screen.

In Digital Breast Tomosynthesis (DBT), data volumes are often reconstructed at a higher resolution, for example at a resolution of 85 microns for a slice thickness of 1.0 mm. Such a high-resolution volume allows visualization of the very fine clinical details required for accurate medical diagnosis of breast cancer, for example microcalcifications of only 100 microns in size, very fine spiculations of masses, etc. A correct depiction of microcalcification morphology and spiculations is critical for the radiologist in order to be able to differentiate between benign and malignant lesions in breast tissue. This means that the amount of data in DBT volumes is very large. For example, the total volume of data for a single patient (e.g. including two DBT views and projection images) can exceed one gigabyte. The large data volume complicates data transfer and increases radiologist workload.

Another reason for generating slabs from the initial data is that a radiologist often needs to evaluate the distribution of an entire cluster of calcifications embedded in the surrounding tissue, including any masses and architectural distortions in that region. In breast tissue, a lesion can often extend over 10.0 mm or more, and can extend in any random direction. Therefore, in order to be able to perform such an evaluation, a radiologist should be provided with very thick slabs, i.e. slabs with a thickness in excess of 10.0 mm. In some cases, it might be desirable to perform such an evaluation over the total volume MIP (essentially the whole volume collapsed into a single slab).

However, the usual techniques of reducing the data volume—for example using AIP to merge slices into slabs—are generally associated with a loss of diagnostic information. A slab is rendered as a 2D image, so that 3D information recorded in a series of 2D slices is effectively 'collapsed' into two dimensions. However, a slab covering a thickness of 2.0 mm or more already suffers from a reduction in contrast and blurred edges of fine calcifications. In a slab covering a thickness of 3.0 mm or more, the edges of masses, spiculations and architectural distortions can be so blurred that the diagnostic usefulness of the slab is severely reduced, and the likelihood of a positive or negative misdiagnosis is increased. Using MIP to generate the slabs can preserve the calcifications, but the finer structural details and the sharpness and contrast of masses and architectural distortions deteriorate significantly even at slab thickness less than 3.0 mm. However, greater slab thicknesses in excess of 3.0 mm are desirable on account of the reduction in data volume and in order to facilitate data transfer, but the loss of diagnostic information associated with the conventional methods make these methods unsuitable for generating such thick slabs.

BRIEF SUMMARY OF THE INVENTION

It is therefore an object of the invention to provide an improved way of preserving the information content when generating thick slabs from a volume of DBT data.

This object is achieved by the method as claimed; by the system as claimed; and by the computer program product as claimed.

According to the invention, the method of performing digital breast tomosynthesis comprises the steps of obtaining an initial volume comprising a plurality of slices, preferably thin slices in a CT procedure; performing edge detection in a slice; processing the detected edges to obtain a weighting volume; and generating a composite slab on the basis of the weighting volume.

An advantage of the method according to the invention is that information associated with edges or contours in each slice can be preserved even when the slices are combined in a thick slab. Edge detection is performed to detect edges or contours in a slice. The edge detection method is preferably tuned to detect fine spiculations and microcalcifications, borders of masses and architectural distortions. Any suitable edge-detection algorithm can be used, for example the Canny edge detector. The result of the edge-detection step is a number of 'binary' slices in which only the contour or edge voxels have a value of 1, while all other voxels have a value of 0.

The edge information is then processed to enhance the contribution of the edges in the composite slab. Effectively, the information content provided by the edges is weighted so that, when the slices are combined to give a thicker slab, information relating to fine calcifications and spiculations will not be 'swallowed' or hidden by other image content, but will remain visible in the final thick slab. The weighting volume can be combined with other information in the initial volume, for example with an AIP slab generated from thin slices of the initial volume, to obtain the composite slab.

According to the invention, the system for computing digital breast tomosynthesis images comprises a data acquisition unit for acquiring input data descriptive of a plurality of slices of an initial volume obtained in a CT procedure; a processing unit for carrying out the steps of the method according to the invention to generate a composite slab; and an output means for outputting image data of the composite slab to a display means.

An advantage of the system according to the invention is that the image presented to a radiologist for assessment contains a high level of relevant diagnostic information, for the reasons given above, so that an accurate assessment of the DBT data can be performed.

According to the invention, the computer program product is capable of carrying out the steps of the inventive method when the computer program product is loaded into a memory of a programmable device, and is realised to output the composite slab as image data for showing on an image display device, for example on a monitor, printer, etc. The image data can be directly shown, for example on a monitor connected to the programmable device, or can be transferred to a remote display unit.

An advantage of the computer program product according to the invention is that image data can be processed in such a way that diagnostically relevant information is preserved or enhanced, Particularly advantageous embodiments and features of the invention are given by the dependent claims, as revealed in the following description. Features of different claim categories may be combined as appropriate to give further embodiments not described herein.

In the following, without restricting the invention in any way, it may be assumed that the initial DBT volume is obtained in the usual manner, for example by taking multiple X-ray images of a breast from several angles. A 'slice' in the context of the invention is to be understood as a 2D original reconstructed slice.

In the following, again without restricting the invention in any way, the terms 'edge' and 'contour' may be used interchangeably, and are to be understood to comprise voxels that are associated with, or appear to be associated with, the boundary of an object in an image, whereby an 'image' is a thin slice of the initial volume.

Preferably, a detected edge in a slice is enhanced in some suitable way. In a particularly preferred embodiment of the invention, the step of processing the detected edges comprises performing morphological dilation on a detected edge to obtain a dilated edge. Effectively, any edge or contour detected in a slice is expanded so that the edge or contour is significantly thicker than in the original slice. For example, a contour extending over a certain distance, with a width of 2 voxels, can be dilated over its length to give a dilated contour with a width of 10 voxels. Preferably, the expansion or morphological dilation is performed symmetrically about a centre of the contour, so that the 'extra' width is added on each side of the contour or edge.

In a further preferred embodiment of the invention, the step of processing the detected edges comprises the step of adjusting the transparency in a dilated edge, whereby the transparency is preferably adjusted in a border or outer region of the dilated edge. Preferably, the transparency is increased gradually from a central region of the dilated edge to an outer border of the dilated edge. To this end, the voxels in the outer regions of a morphologically dilated contour can be blurred, for example using some suitable kind of blurring filter. Various such filters are known from the field of digital image processing, for example, a Gaussian blur algorithm can be applied in the step of adjusting the transparency of the dilated edge.

By modifying or enhancing the edge/contour information in this way, the critical and information-laden central strip of a contour in a slice is given more weight in the slab by ensuring that it remains visible even through 'higher' slices in the slab, while the outer regions are given less weight, so that image content from 'lower' slices in the slab can still be seen through the partially transparent outer regions of the morphologically dilated contours.

In the conventional techniques for generating a thick slab, information is lost when edges of different slices overlap partially or completely. In the method according to the invention, the semi-transparency of the morphologically dilated edges reduces or eliminates the loss of information when such edges overlap.

Another problem arises in the case of low contrast between voxels of a contour and its adjacent region. The low contrast makes it difficult to detect the contour or edge with certainty, so that such "weak edges" may go undetected in the conventional techniques. The method according to the invention makes it possible to improve the detection of such low contrast sections of a contour, and, in another preferred embodiment of the invention, the step of performing edge detection comprises the step of connecting a weak edge patch to an adjacent strong edge patch. In this way, all continuous edges, whether weak or strong, are preserved in the composite slab.

As already indicated above, the slices with the enhanced edge information are combined to give the weighting volume, and this weighting volume is then combined with another slab, for example an AIP slab over the same or greater volume, to give the composite slab. Such a composite slab therefore shows the soft tissue content provided by AIP, together with the diagnostically critical edge information rendered visible by the weighting volume. The combination of the weighting volume with the other volume effectively comprises an alpha-compositing step, and the weighting volume can be regarded as a set of alpha channels for the volume slices. The composite slab therefore permits a more accurate assessment of the relevance of fine spiculations, architectural distortions and other edges relative to the soft tissue content, since these are not lost when generating the thick slab. The composite slab therefore makes it possible to make a more accurate diagnosis.

In another preferred embodiment of the invention, the composite slab obtained using the method according to the invention can also be based on an MIP slab, since an MIP slab provides high-contrast detail regarding microcalcification structures. Such an MIP slab can be generated from a volume with a thickness at least as great as the thickness of the composite slab volume, i.e. using at least as many slices. Such a 'linear combination' of MIP, AIP and composite slab could be utilized to obtain a meta-slab containing high-contrast details such as microcalcifications from an MIP slab, soft tissue density distribution from an AIP slab and important edge information from the composite slab. This type of linear combination allows a degree of control over the transparency of the dilated edges, and can be used as desired to put different emphasis on the visualization of calcifications, soft tissue density or edges and spiculations.

As already indicated above, the method according to the invention makes it possible to preserve all continuous weak and strong edges in a composite slice, owing to the semi-transparency added to the morphologically dilated edges. However, an edge of one slice that is covered completely by a non-transparent part of an edge of a higher slice may still be 'lost'. This can lead to a loss of information in some cases. For example, a diagnostically relevant structure such as a mass or architectural distortion may not be optimally reflected in a composite slab. Similarly, spiculations around a mass, or architectural distortions ('wrinkles') in a tissue that diverge from a single point, may also be less than optimally rendered. The reason is that related contour lines, i.e. contour lines belonging to a single structure that extends over consecutive slices of the original volume, can overlap with very small shifts or offsets. As a result, the contours in the top or highest slice, i.e. the contours that are added last, will dominate the resulting picture. However, the most relevant or representative contours of a blob-like or spiculated structure are those in the central region of the structure. Therefore, in a further preferred embodiment of the invention, a detection step is performed to detect a blob and/or a spiculated mass in the initial volume. This can be done in any suitable way, for example by applying the method described in WO 2008/024353 A2. A detected mass or blob can then be given more weight by re-arranging the slices such that the slices showing the central or inner region of the blob or spiculated structure are arranged above other slices showing that structure. Alternatively, the order of the slices can be left unchanged, but edges and contours in the central slice containing the mass or blob can be given more weight.

Because of the nature of representing a 3D volume or a very thick slab in a 2D plane, some information is inevitably lost due to occlusions. Therefore, in a preferred embodiment of the invention, the steps of the method are repeated for a plurality of different viewing directions. This can be achieved by computing and visualizing several such slabs from different viewing directions. A number of thick meta-slabs could be calculated by 'collapsing' the slices not only in the direction orthogonal to the slice or detector plane, but projecting the slices into a desired viewing direction. For example, this could be achieved by performing oblique multi-planar reconstruction into slices orthogonal to the viewing direction and then collapsing along the viewing direction. While this approach is preferred, it may be quite time-consuming. An alternative approach, therefore, is based on collapsing the originally reconstructed slices along the viewing direction.

Generally, the top and bottom slices of a DBT volume represent tissue such as epidermis, hypodermis etc., with a thickness of 5-7 mm, and containing little or no diagnostically relevant information. Therefore, in a further preferred embodiment of the invention, the method comprises the step of discarding an uppermost slice and/or a lowermost slice of the initial volume. In this way, reconstruction of a whole-volume slab such as a composite slab or a meta-slab can avoid occlusions and blur resulting from diagnostically irrelevant tissues and structures.

The steps of the method according to the invention are carried out by a computer program product, for example as a number of algorithms developed to process the DBT volume, when the computer program product is loaded into a memory of a programmable device.

Other objects and features of the present invention will become apparent from the following detailed descriptions considered in conjunction with the accompanying drawings. It is to be understood, however, that the drawings are designed solely for the purposes of illustration and not as a definition of the limits of the invention.

DETAILED DESCRIPTION OF THE INVENTION

In the diagrams, like numbers refer to like objects throughout. Objects in the diagrams are not necessarily drawn to scale.

Figure 1:
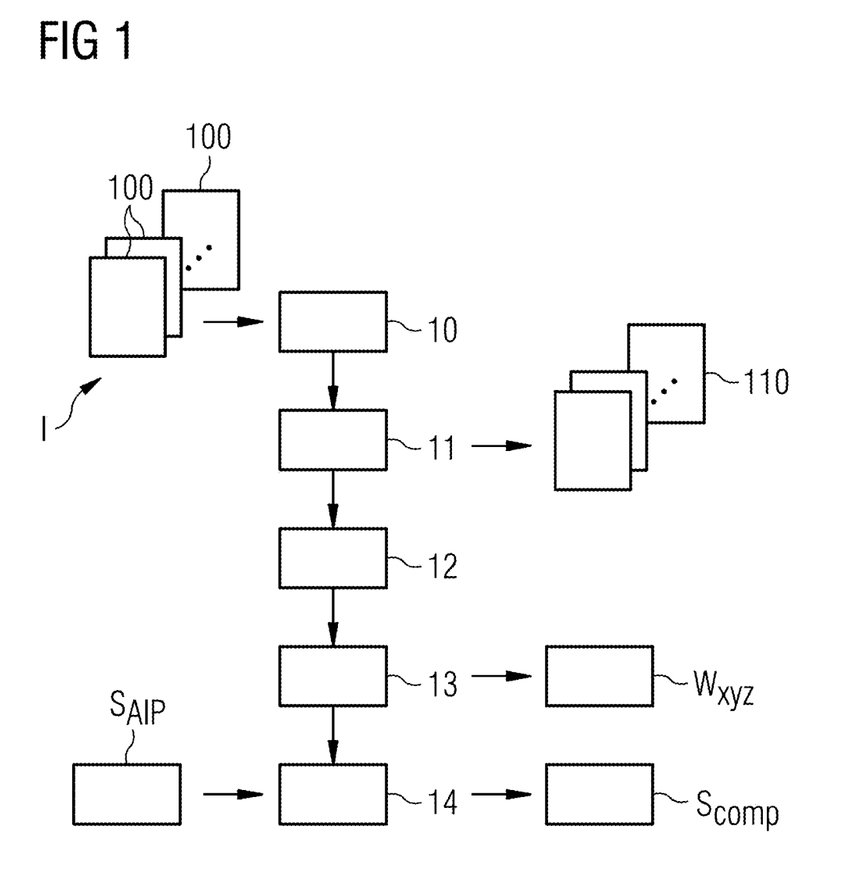
FIG. 1 shows a flow diagram showing steps in an embodiment of the method according to the invention.

FIG. 1 shows a flow diagram showing steps in an embodiment of the method according to the invention, with input data I, 100, $S_{AIP}$ indicated on the left-hand side and output data 110, $W_{xyz}$, $S_{comp}$ indicated on the right-hand side.

In a first step 10, an initial volume I comprising a number of 2D original reconstructed DBT thin slices 100 is obtained, for example from a memory module of a computer. Each thin slice can have a thickness of 0.5-1.0 mm, for example, and the image can be taken at a high resolution such as 85 micrometres or microns. The image data of a thin slice 100 is stored as voxel array.

In a subsequent step 11, edges are detected in each 2D original reconstructed slice 100. The edge detection method is tuned to detect fine spiculations and microcalcifications, borders of masses and architectural distortions. The weak edge patches adjacent to the stronger edges are connected. Any suitable edge-detection algorithm can be used, for example the Canny edge detector. The result of this step is a number of binary slices 110 in which only the contour or edge voxels have a value of one ("1"), while all other voxels have a value of zero ("0").

In a following step 12, morphological dilation is performed to dilate the contour lines obtained in step 11 to a thickness of at least 5 voxels.

Subsequently, in step 13, the contour image slices are blurred by applying a blur filter e.g. Gaussian blur, such that the voxels along the centre "strip" of a morphologically dilated edge remain 1, while the edge voxels of the contour strip smoothly fade to the background value of 0. The result of this step is a weighting volume $W_{xyz}$ in which sharp edges of each slice 110 have been replaced by wider contours with 'soft' or semi-transparent borders. Only the central voxels have a value of 1, and the background voxels have a value of 0, while the transition region blends smoothly from 1 to 0.

Steps 12 and 13 could be merged by applying a suitable filtering algorithm. For example, each voxel in the vicinity of an edge voxel can be assigned a value of m such that $$m = \begin{cases} 1, r < d \\ e^{\frac{(r-d)^2}{2\sigma^2}}, d \geq r \geq t \end{cases} \quad (1)$$

where d is the dilation width, t is a smooth transition width, $\sigma$ is standard deviation, and r is the distance to the edge voxel.

In a further step 14, 2D values of a composite thick slab $S_{comp}$ or 'total volume slab' $S_{comp}$ are computed using an AIP slab $S_{AIP}$ obtained from the original volume I and the weighting volume $W_{xyz}$ as follows:

$$S_{comp} = \begin{cases} I_{xyz_{max}} \forall W_{xyz_{max}} = 1, \text{ where } z_{max} = \text{argmax}_z W_{xyz} \\ k * \sum_{z \in slab} \frac{I_{xyz} * W_{xyz}}{n_z} + \\ \left(1 - \frac{k * \sum_{z \in slab} W_{xyz}}{n_z}\right) \frac{\sum_{z \in slab} I_{xyz}}{N} \forall W_{xyz_{max}} < 1 \end{cases} \quad (2)$$

where the AIP slab $S_{AIP}$ is given by the term:

$$S_{AIP} = \frac{\sum_{z \in slab} I_{xyz}}{N} \quad (3)$$

In equations (2) and (3), $I_{xyz}$ is an original volume voxel; N is total number of slices in a slab; $n_z$ is the number of original thin slices in a slab, or for each column XY, $n_z$ could be the number of instances for which $W_{xyz} > 0$; $z_{max}$ has the value of $\mathrm{argmax}_z W_{xyz}$; and k is a scalar linear coefficient for which $0 < k < 10$.

For every voxel of the volume for which the corresponding voxel $W_{xyz}$ in the weighting volume has a value of 1 or the maximum value in that column, the corresponding pixel in the composite slab is given the $I_{xyz}$ value of that XY column from slice 'z'. This decision is made for every voxel that is part of a morphologically dilated contour.

For a $W_{xyz}$ value less than 1, a foreground pixel value $I_{xyz}$ is adjusted according to the weight of the corresponding voxel belonging to an outer region of a morphologically dilated contour.

Equation (2) effectively applies an alpha-compositing (or 'alpha blending') technique to make smooth semi-transparent transitions between patches from different slices and the background AIP slab $S_{AIP}$. The resulting composite thick slab $S_{comp}$ can be used for a more accurate interpretation of the information present in the original DBT volume I.

Figure 2:
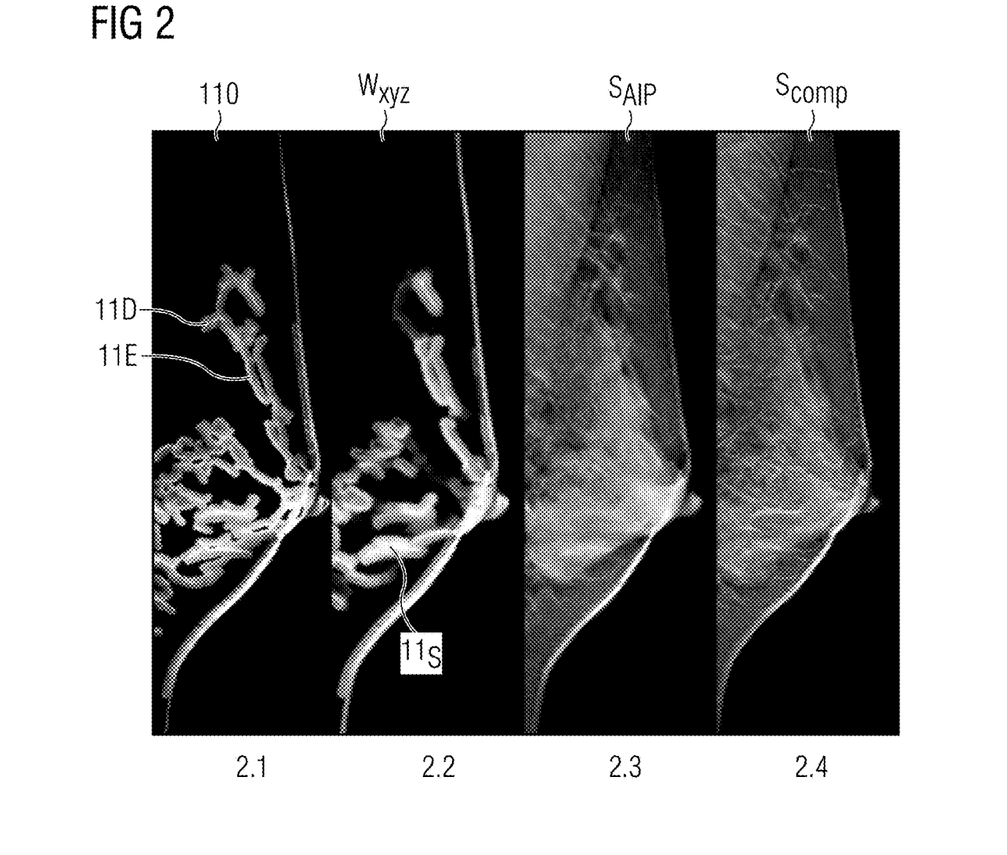
FIG. 2 shows images associated with various stages of the method according to the invention.

FIG. 2 shows images 2.1, 2.2, 2.3, 2.4 associated with various parts or stages of Equation (2). The first image 2.1 shows the original volume intensities in dilated edges $11_D$, for all edges $11_E$ detected in a slice of the volume in step 11 of the method. This corresponds to the upper part of equation (2). In a slice 110, an original edge $11_E$ is shown as a thin white contour, and the dilated edge $11_D$ is shown as a grey region on both sides of the thin white contour.

The second image 2.2 illustrates a slice of the weighting volume $W_{xyz}$ in which morphologically dilated edges $11_S$ have outer semi-transparent regions. This corresponds to the "1 minus" term in brackets in the lower part of Equation (2), which performs the alpha-blending or alpha-compositing step on the AIP background pixels.

The third image 2.3 shows an AIP slab $S_{AIP}$, showing typical indefinite regions for which an accurate assessment of tissue quality is difficult or impossible. In the method according to the invention, the AIP slab $S_{AIP}$ serves as a "background" for the composite slab.

The fourth image 2.4 shows a composite slab $S_{comp}$ obtained using the smoothed, semi-transparent edges $11_S$ obtained in steps 12, 13 of the method and after applying Equation (2) to the image voxels of the AIP slab $S_{AIP}$. Compared to the AIP slab $S_{AIP}$ in the third image 2.3, the composite slab $S_{comp}$ of the image 2.4 shows edges and structures in significantly greater detail and sharpness. The high level of edge-related detail allows a more accurate evaluation of the relationship between any masses and thin lines or structures so that it is possible to determine, with a correspondingly high degree of accuracy, the presence or absence of a lesion or tumour mass in the breast tissue. Furthermore, an assessment as regards malignancy can be performed with a greater degree of confidence.

Figure 3:
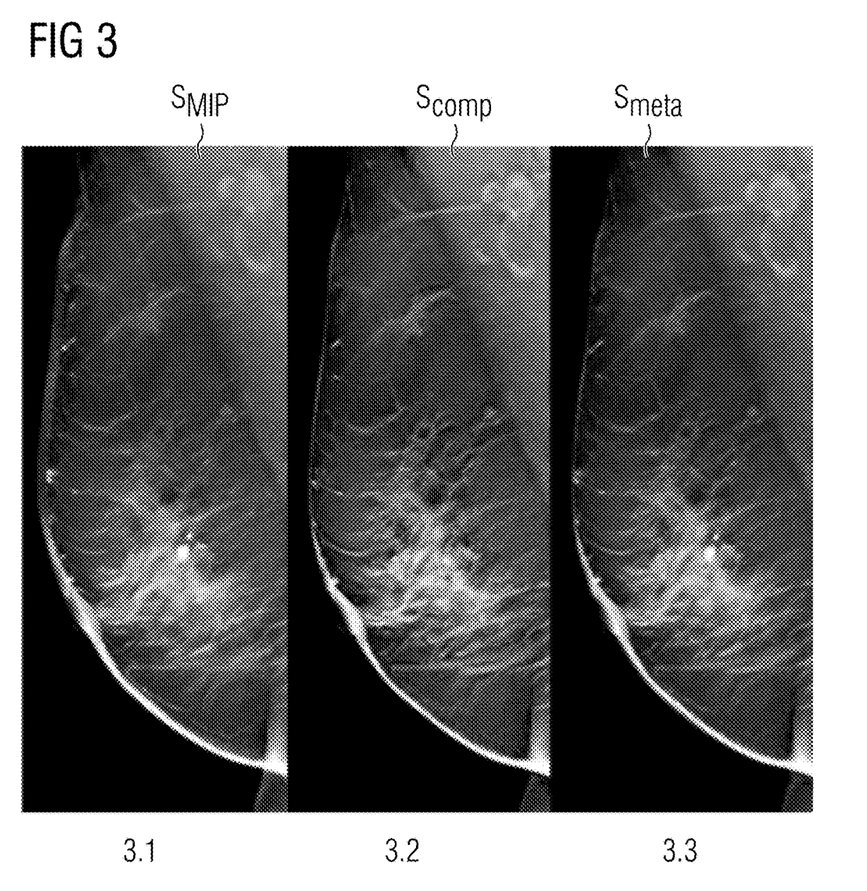
FIG. 3 shows further images associated with various stages of the method according to the invention.

FIG. 3 shows further images 3.1, 3.2, 3.3 associated with various stages of the method according to the invention, in which a composite slab is computed from an initial slab, for example from a set of 2D original reconstructed DBT thin slices as explained above, and combined with a slab obtained by performing MIP over the same initial slab.

The use of scalar linear coefficients in the linear combination of terms when computing the composite slab permits accurate control of transparency in the borders of the morphologically dilated edges. For example, the linear coefficient k in equation (2) can be applied to compute the 'edge' contribution with AIP of that slab. Another linear coefficient l could be used with MIP of the same slab, as shown in the following equation:

$$S_{meta} = l * S_{comp} + (1-l) * \mathrm{MIP} \quad (4)$$

In this way, the method according to the invention allows different emphasis to be placed as desired on the visualization of calcifications, soft tissue density or edges and spiculations.

The first image 3.1 shows an MIP slab $S_{MIP}$ computed from a DBT volume. The second image 3.2 shows a composite slab $S_{comp}$ obtained using the method described in FIGS. 1 and 2 above. The third image 3.3 shows a meta-slab $S_{meta}$ obtained by adding the MIP slab $S_{MIP}$ to the composite slab $S_{comp}$.

The results can be further refined, for example by performing AIP over the initial volume and adding this to the composite slab $S_{comp}$. The resulting meta-slab $S_{meta}$ contains high-contrast details such as microcalcifications rendered visible using MIP, soft tissue density distribution rendered visible using AIP, and important edge information rendered visible in the composite slab $S_{comp}$.

Figure 4:
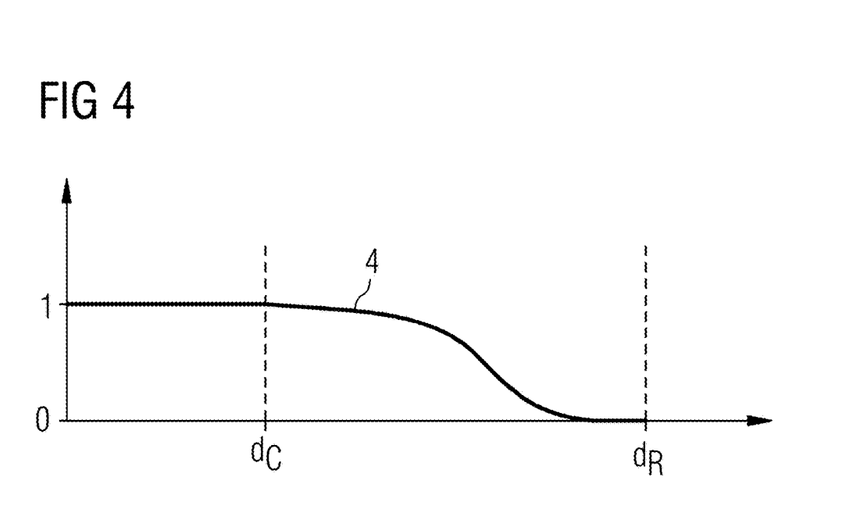
FIG. 4 shows a graph of a dilating and smoothing filter function used in the method according to the invention.

FIG. 4 shows a graph 4 of a dilating and smoothing filter function used in the method according to the invention. The function is applied after morphological dilation has been performed on the edges $11_E$ detected in step 12 of the method explained in FIG. 1 above. The effect of applying this function is to blur the edges $11_E$ detected in the contour image slices (the binary slices 110 obtained in step 11 of FIG. 1) such that the voxels along the centre of a dilated edge $11_D$ retain a value of 1 (by applying a mask value), while the borders of the contour fade smoothly into the background according to a defined gradient (by applying a blur value), as was illustrated in image 2.3 of FIG. 2. The outermost voxels receive a value approaching 0. The mask value of 1 is applied to voxels within a certain distance $d_C$ from the centre, while the blur value (e.g. using a Gaussian blur filter) is applied to the remaining voxels up to a certain radius $d_R$ from the centre. Of course, this filter function is applied symmetrically about the central strip of a dilated edge $11_D$ in a binary slice 110.

Figure 5:
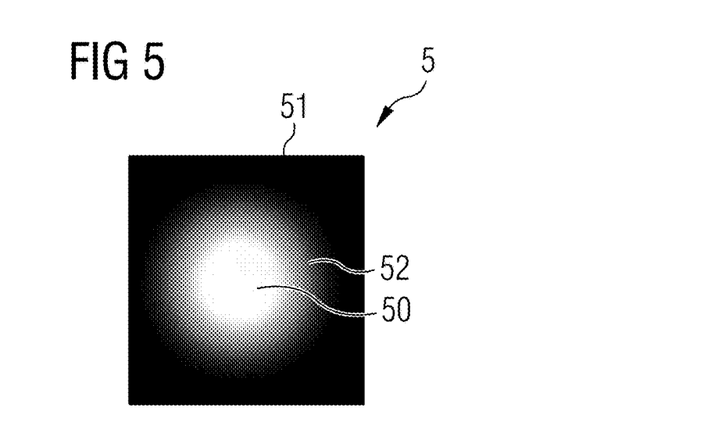
FIG. 5 shows a dilation and smoothing mask used in the method according to the invention.

FIG. 5 shows an exemplary dilation and smoothing mask 5. The inner white region or opaque foreground 50 corresponds to a mask value of 1, while the outer black region or transparent background 51 corresponds to a mask value of 0. The intermediate zone or transition 52, with increasing transparency level from 1 to 0, corresponds to the blur function.

Figure 6:
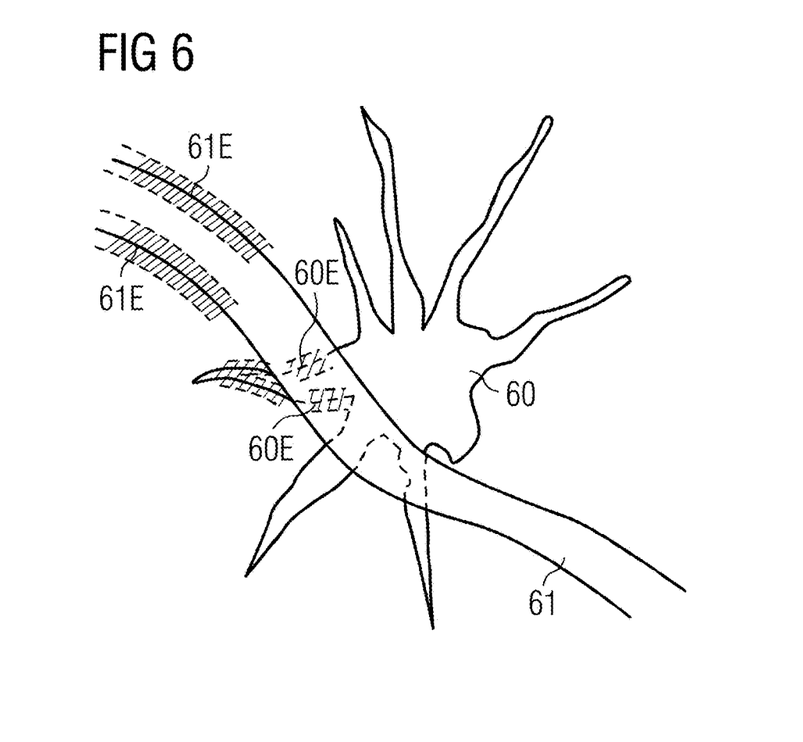
FIG. 6 shows a schematic representation of a number of objects in a composite volume generated using the method according to the invention.

FIG. 6 shows a schematic representation of a number of objects 60, 61 as they might be rendered in a composite volume generated using the method according to the invention. Here, a mass 60 appearing in one or more lower slices is partially covered by a vessel such as a blood vessel 61 recorded in a slice at a higher level. In the known approaches, diagnostically important information may be occluded or lost when an object in a higher slice (such as the blood vessel in this case) traverses and hides a significant fraction of another object in a lower slice (such as the mass 60 in this case). In the method according to the invention, the edges of the detected objects 60, 61 in the slices are morphologically dilated and voxels of the dilated edges 60E, 61E are assigned a level of opaqueness or semi-transparency according to their distance from the edge's centre. The semi-transparency of the edges 60E, 61E in the lower and higher slices is indicated by hatching (for clarity, the semi-transparency is only indicated for some sections; however all edges are treated thus in the method according to the invention). The diagram illustrates the usefulness of the method according to the invention, since edges 60E of the mass 60 behind the vessel 61 are visible through the "transparent" regions between dilated edges of the vessel 61 in the higher slice. The composite slab will therefore show these edges 60E of the mass 60, allowing a more accurate assessment of the nature of the mass 60. The diagram shows that the method according to the invention allows edge information to be retained even when objects overlap. In the conventional techniques, some edges of the mass 60 would have been completely occluded by the vessel 61, and a correct interpretation of the image would have been more difficult or less accurate.

Figure 7:
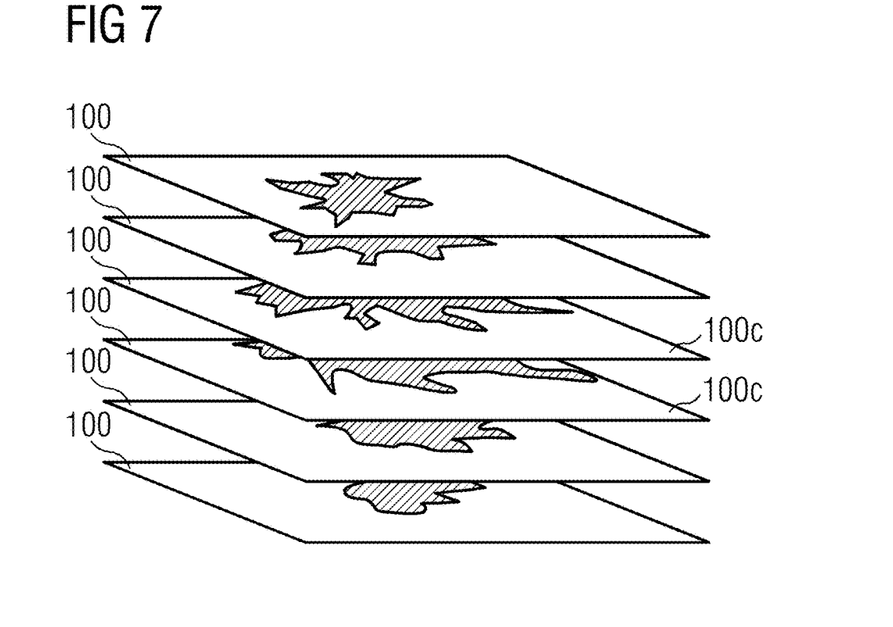
FIG. 7 shows a schematic representation of a number of slices of a DBT volume.

FIG. 7 shows a schematic representation of a number of thin slices 100 of a DBT volume. Each of the slices 100 shown contains some information regarding a spiculated mass, indicated as a spiky shape in each slice. Detail in a central slice 100$_C$ is generally of high diagnostic relevance. However, some of this detail may be occluded by detail in the higher slices when the slices are combined to give an AIP or MIP slab. Therefore, as described above, the slices may be re-arranged such that the central slice 100$_C$ lies 'on top' of the other relevant slices. Alternatively, using the method according to the invention, the edges and contours in a central slice 100$_C$ may be weighted to a greater extent than the edges and contours of the other slices.

Figure 8:
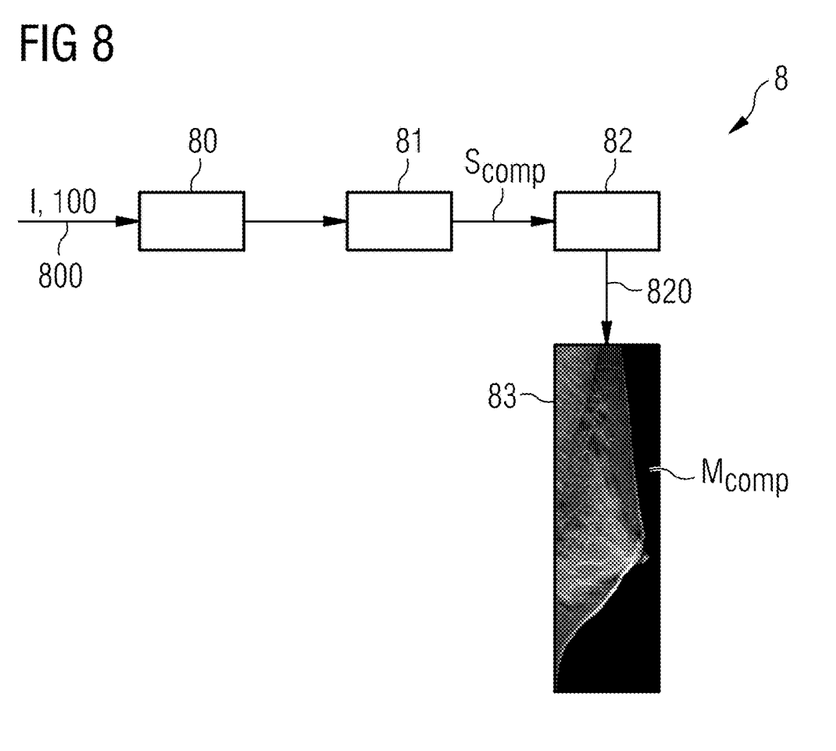
FIG. 8 shows a simplified block diagram of an imaging system 8 according to the invention for computing digital tomosynthesis images.

FIG. 8 shows a simplified block diagram of an imaging system 8 according to the invention for computing digital tomosynthesis images. The imaging system 8 comprises a data acquisition unit 80 for acquiring input data 800 relating to an initial DBT volume I. The input data can comprise any number of slices 100 for such a volume I. The system 8 also comprises a processing unit 81 for carrying out the steps of the method according to the invention, i.e. for performing edge detection, dilation and smoothing, weighting etc. and for combining the information with AIP or MIP slabs for that volume to obtain a composite slab $S_{comp}$ (or a meta slab $S_{meta}$) as described above. To display a slab $S_{comp}$ obtained in this way, the system 8 comprises an output means 82 such as a suitable graphics interface for outputting image data 820 of the slab $S_{comp}$ to an image display means 83, which can be a monitor, a printer, or other display means, so that the composite slab can be displayed as an image $M_{comp}$ for a visual analysis by a radiologist or other qualified person. Examples of such images have been given in FIGS. 2 and 3 above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The following is a list of reference numerals and symbols used in the above description:
- 10 method step
- 100 2D original reconstructed DBT slice
- 100$_C$ central slice
- 11 method step
- 11$_E$ edge
- 11$_D$ dilated edge
- 110 edge detection result
- 12, 13, 14 method step
- 4 smoothing filter function graph
- 5 mask
- 50 foreground
- 51 transition
- 52 background
- 60 mass
- 60E edge of mass
- 61 vessel
- 61E edge of vessel
- 8 system
- 80 data acquisition unit
- 800 input data
- 81 processing unit
- 82 output means
- 820 image data
- 83 display
- $W_{xyz}$ weighting volume
- $S_{AIP}$ AIP slab
- $S_{MIP}$ MIP slab
- $S_{comp}$ composite slab
- $S_{meta}$ meta-slab
- $M_{comp}$ image of composite slab
- $d_C$ centre strip radius
- $d_R$ dilation radius

The invention claimed is:

1. A method of performing digital tomosynthesis, which method comprises the steps of
   obtaining an initial volume comprising a plurality of slices;
   performing edge detection in a slice;
   processing the detected edges to obtain a weighting volume, the processing including expanding the width of the detected edges by performing morphological dilation on the detected edges to obtain a dilated edge such that extra width is added on each side of the detected edges symmetrically about a center of each detected edge to increase the thickness of the respective detected edge; and
   generating a composite slab on the basis of the weighting volume.

2. The method according to claim 1, wherein the step of processing the detected edges comprises a step of adjusting the transparency in a region of a dilated edge.

3. The method according to claim 2, which comprises adjusting the transparency in a border region of a dilated edge.

4. The method according to claim 3, which comprises gradually increasing the transparency from a central region of the dilated edge to an outer border of the dilated edge.

5. The method according to claim 2, which comprises gradually increasing the transparency from a central region of the dilated edge to an outer border of the dilated edge.

6. The method according to claim 2, which comprises applying a Gaussian blur algorithm in the step of adjusting the transparency of the dilated edge.

7. The method according to claim 1, which comprises adjusting the transparency in a border region of a dilated edge.

8. The method according to claim 1, comprising a step of generating an AIP slab from a volume for use in generating the composite slab.

9. The method according to claim 1, comprising a step of generating an MIP slab for use in generating the composite slab.

10. The method according to claim 9, which comprises generating the MIP slab from a volume with a thickness at least as great as a thickness of the composite slab volume.

11. The method according to claim 1, wherein the step of performing edge detection comprises a step of connecting a weak edge patch to an adjacent strong edge patch.

12. The method according to claim 1, wherein a detection step is performed to detect a blob and/or a spiculated mass in the initial volume.

13. The method according to claim 12, comprising a step of arranging a middle slice of a detected blob and/or spiculated mass at an upper level in the composite slab and/or assigning a higher weight to a slice of a detected blob and/or spiculated mass.

14. The method according to claim 1, wherein steps of the method are repeated for a plurality of different viewing directions.

15. A system for computing digital tomosynthesis images, which system comprises:
 a data acquisition unit for acquiring input data descriptive of a plurality of slices of an initial volume;
 a processing unit for carrying out the steps of the method according to claim 1 to generate a composite slab; and
 an output means for outputting image data of the composite slab to a display.

16. A computer program product in non-transitory form for carrying out the steps of the method according to claim 1 when the computer program product is loaded into a memory of a programmable device, which computer program product is realized to generate composite slab data for showing on an image display device.

17. A method of performing digital tomosynthesis, which method comprises the steps of
 obtaining an initial volume comprising a plurality of slices;
 performing edge detection in a slice;
 processing the detected edges in a slice to obtain a weighting volume by:
  processing the slice to produce a binary slice in which only detected edge voxels have a value of one, while all other voxels have a value of zero;
  subsequently, expanding the width of the detected edges by morphologically dilating the detected edges in the slice by adding extra width symmetrically about a center of each detected edge to increase the thickness of the respective detected edge; and
  adjusting the transparency of the dilated edge to produce the weighting volume, wherein only voxels along a center of a dilated edge have a value of 1, background voxels have a value of 0 and a transition region of the dilated edge blends from 1 to 0; and
 generating a composite slab on the basis of the weighting volume.

* * * * *